(12) United States Patent
Tse et al.

(10) Patent No.: US 8,139,873 B2
(45) Date of Patent: *Mar. 20, 2012

(54) BINARY IMAGE DATA PROCESSING SYSTEM AND METHOD

(75) Inventors: Francis Kapo Tse, Rochester, NY (US);
Ramesh Nagarajan, Pittsford, NY (US);
James Russell, Ontario, NY (US);
Chia-Hao Lee, Hacienda Heights, CA (US); John W. Wu, Rancho Palos Verdes, CA (US)

(73) Assignee: Xerox Corporation, Norwalk, OH (US)

( * ) Notice: Subject to any disclaimer, the term of this patent is extended or adjusted under 35 U.S.C. 154(b) by 285 days.

This patent is subject to a terminal disclaimer.

(21) Appl. No.: 12/474,337

(22) Filed: May 29, 2009

(65) Prior Publication Data

US 2009/0279145 A1 Nov. 12, 2009

Related U.S. Application Data

(62) Division of application No. 11/316,764, filed on Dec. 23, 2005, now Pat. No. 7,561,747.

(51) Int. Cl.
*G06K 9/36* (2006.01)
*H04N 1/41* (2006.01)
*G06K 9/46* (2006.01)

(52) U.S. Cl. .................. 382/232; 358/426.01

(58) Field of Classification Search .................. 382/173, 382/176, 180, 205, 224, 232, 233, 244–246, 382/254, 267, 293, 305, 318; 358/1.9, 3.06, 358/3.08, 3.1, 3.21, 3.27, 426.01, 505, 522; 345/435, 596; 348/584

See application file for complete search history.

(56) References Cited

U.S. PATENT DOCUMENTS

| | | | | |
|---|---|---|---|---|
| 5,254,982 A | * | 10/1993 | Feigenblatt et al. | 345/690 |
| 5,799,112 A | * | 8/1998 | de Queiroz et al. | 382/254 |
| 5,822,469 A | * | 10/1998 | Silverstein | 382/267 |
| 6,343,159 B1 | | 1/2002 | Cuciurean-Zapan et al. | |
| 6,493,463 B1 | | 12/2002 | Nagarajan et al. | |
| 6,816,269 B1 | * | 11/2004 | Loce et al. | 358/1.12 |
| 7,352,490 B1 | * | 4/2008 | Tse et al. | 358/1.9 |
| 7,492,486 B2 | * | 2/2009 | McCandlish et al. | 358/3.27 |
| 7,561,747 B2 | * | 7/2009 | Tse et al. | 382/232 |
| 7,697,789 B2 | * | 4/2010 | McCandlish et al. | 382/299 |
| 2005/0275666 A1 | * | 12/2005 | Nagarajan | 345/660 |
| 2007/0103731 A1 | * | 5/2007 | Tse et al. | 358/3.27 |
| 2007/0109602 A1 | | 5/2007 | Tse et al. | |
| 2007/0133062 A1 | * | 6/2007 | McCandlish et al. | 358/3.27 |
| 2007/0147687 A1 | | 6/2007 | Tse et al. | |
| 2007/0258101 A1 | | 11/2007 | Nagarajan et al. | |
| 2009/0067736 A1 | * | 3/2009 | Payton | 382/250 |
| 2009/0279145 A1 | * | 11/2009 | Tse et al. | 358/426.01 |
| 2010/0046856 A1 | * | 2/2010 | Bai et al. | 382/293 |

* cited by examiner

*Primary Examiner* — Amir Alavi
(74) *Attorney, Agent, or Firm* — Fay Sharpe LLP

(57) ABSTRACT

The image data processing system and method disclosed, processes intermediate compressed binary data representing images scanned for copy or exporting, thereby enabling storage of the copy or export file to a common memory storage device. According to an exemplary embodiment, the image data processing system comprises a binary lossless decompress module, a binary to contone restoration module, and an export processing module, the export processing module processing multiple bit image data for exporting to an image data receiving device.

11 Claims, 5 Drawing Sheets

BINARY IMAGE DATA PROCESSING SYSTEM AND METHOD

The present invention is a divisional of U.S. patent application Ser. No. 11/316,764 filed Dec. 23, 2005 now U.S. Pat. No. 7,561,747, which is incorporated herein by reference.

BACKGROUND

Conventional systems to scan a document and export the image of the document require images to be lightly compressed in JPEG to reduce the size of the image for storage in EPC (Electronic Precollation Memory). Compression is needed to reduce the bandwidth requirement for storage and retrieval of the scanned images. The lightly compressed images are recalled, decompressed and processed to the final export format.

In a MFD (Multi Function Device) that uses a binary format for EPC storage for copy scanning, extra hardware or computer resources are required to implement the JPEG compression to generate scanned images for export. This method and apparatus for generating scanned images for export has costs associated with the additional hardware and costs associated with potential speed limitations.

CROSS REFERENCE TO RELATED PATENTS AND APPLICATIONS

20042009-US-NP, Ser. No. 11/272,182, Filed Nov. 10, 2005, by Ramesh Nagarajan et al., entitled METHOD AND SYSTEM FOR IMPROVED COPY QUALITY IN A MULTIFUNCTION REPROGRAPHIC SYSTEM is hereby totally incorporated herein by reference.

20042011-US-NP, Ser. No. 11/281,267, Filed Nov. 17, 2005, by Francis K. Tse et al., entitled METHOD AND SYSTEM FOR IMPROVED COPY QUALITY IN A MULTIFUNCTION REPROGRAPHIC SYSTEM is hereby totally incorporated herein by reference.

U.S. Pat. No. 6,343,159, issued Jan. 29, 2002, to Clara Cuciurean-Zapan et al., entitled METHOD AND APPARATUS FOR MODELING AND RECONSTRUCTION OF HALFTONED IMAGES is hereby totally incorporated herein by reference.

BRIEF DESCRIPTION

An image data processing system is disclosed. According to one exemplary embodiment of the image data processing system, the system comprises an input scanner configured to generate a first image data output and an image pre-process module is configured to receive the first image data output. The image pre-process module generates a second image data output in a binary format and a data compression module is configured to compress the second image data output and generate a third image data output. A binary data memory device is configured to store the third image data output. A data decompression module retrieves and decompress the third image data output and generates a fourth image data output substantially equivalent to the said second image data output. A binary to contone restoration module restores the fourth image data output to a fifth image data output in a contone format.

According to another exemplary embodiment, this disclosure provides an image data processing system comprising a binary lossless decompress module, configured to receive compressed binary image data and decompress said binary image data; a binary to contone restoration module, operatively connected to the binary lossless decompress module, the binary to contone restoration module converting the decompressed binary image data to multiple bit image data; and an export processing module operatively connected to the binary to contone restoration module, the export processing module processing the multiple bit image data for exporting to an image data receiving device.

According to another aspect, this disclosure provides a method of processing digital image data comprising scanning an image to produce digital image data; pre-processing the digital image data to produce binary image data; compressing the binary image data; storing the compressed binary image data on a binary image data device; retrieving the compressed binary image data from the binary image data device; decompressing the compressed binary image data; restoring the decompressed binary image data to contone image data; and exporting the contone image data to an image data receiving device.

DETAILED DESCRIPTION

This disclosure uses a binary data format as an intermediate memory storage format for a scanned image to be exported. This export scanning system and method can utilize existing hardware related to image segmentation, color conversion, error diffusion and binary data compression, which has been optimized in cost, performance and functionality for copy scanning. The system and method disclosed provides an intermediate compressed image format for images scanned for copy or exporting, thereby enabling storage of the copy or export file to a common memory storage device. The use of a common memory storage device eliminates the additional costs associated with hardware and performance related to current copy and scanning systems and methods. These costs are discussed in the background section of this disclosure.

Figure 1:
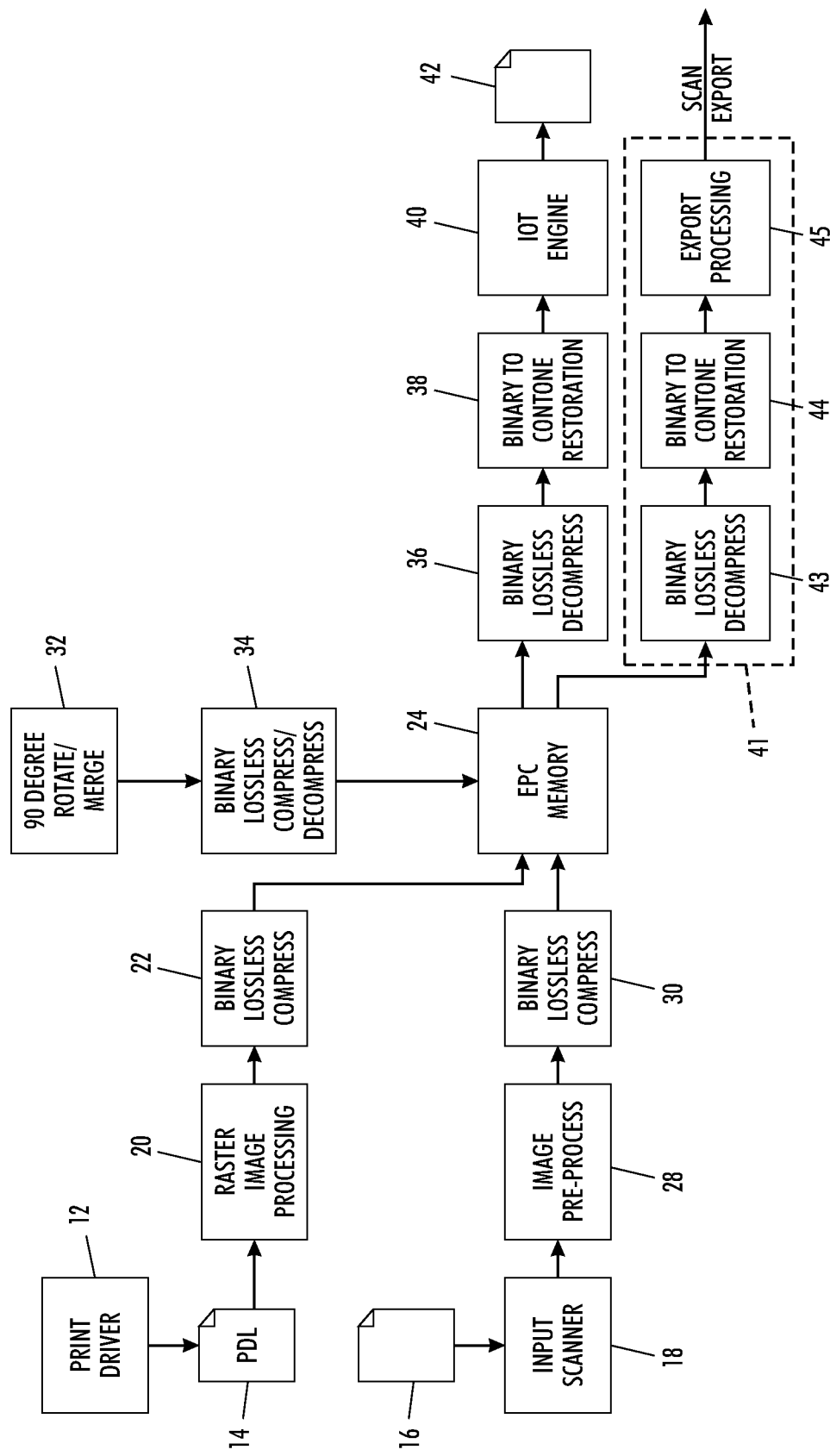
FIG. 1 is a schematic representation of an image data path according to one exemplary embodiment.

With reference to FIG. 1, a system and method of processing image data according to an exemplary embodiment of this disclosure is described. FIG. 1 schematically illustrates a MFD (Multi-Function Device) which is able to print a color or black/white image. The MFD receives image data from a print driver 12 or input scanner 18. The image data is subsequently processed and stored in a memory device 24 until the MFD reproduces the original image at an IOT (Image Output Terminal) 40 and/or exports 45 the image data file to an image data receiving device (not shown) for further processing, storage or other operation.

This binary based image data processing system and method provides a user with the ability to use a single scan for both copy and export functions. Moreover, as will be discussed in further detail below, a single image data processing path from the scanner 18 to a memory storage device 24, irrespective of the output desired (i.e. IOT or Scan Export), eliminates the need of traditional JPEG hardware or software, and associated costs, to process image data for exporting a scanned image, as is conventionally done and previously discussed in the background section of this disclosure.

With continuing reference to FIG. 1, the operational details of a MFD that incorporates a binary image data format for scan to export, according to an exemplary embodiment of this disclosure, is described. Central to the MFD is a binary data storage device. One example of a binary storage device is an EPC (Electronic Precollation) memory 24, however, other binary data storage devices are within the scope of this disclosure and known to those of skill in the art. The EPC memory 24 stores binary formatted data generated by a print driver 12 image data input path and/or generated by an input scanner 18 image data input path.

With regard to the print image data path, one possible print operation, as illustrated in FIG. 1, is a print driver 12 located on a network, pc or other digital device which includes the appropriate software, produces a PDL (Page Description Language) file 14 for printing or display on an IOT. The PDL file 14 is processed by a Raster Image Processing Module 20 to produce binary formatted data capable of being compressed by a binary lossless compress module 22 for storage on the EPC memory device 24.

With regard to the input scanner image data input path, initially an image 16 is scanned by the input scanner 18. The output data of the input scanner is next processed by an Image Pre-process Module 28 which formats the scanner output data to a binary format. The binary formatted image data is next compressed by a binary lossless compress module 30 and stored in the EPC memory device 24.

In addition to the print image data path and the scanner image data path, the MFD illustrated in FIG. 1 also includes a rotate/merge image data path interfaced with the binary image storage device 24 (ex. EPC memory). The rotate/merge image data path provides the MFD with the function of a 90 degree rotate/merge 32, as related to the initial print driver image and/or the input scanned image.

To execute a 90 degree rotate/merge operation 32, the EPC memory device 24 retrieves the binary image data representing the appropriate image. Subsequent to the binary image data retrieval from memory 24, the binary image data is decompressed by the binary lossless compress/decompress module 34. The decompressed image data is rotated 90 degrees or merged with another image file by the 90 degree rotate/merge module 32. After completing the image rotate and/or merge operation, the resulting image data file is compressed by the binary lossless compress/decompress module 34 before being stored in the EPC memory device 24 for storage or further processing.

Possible further processing of the binary image data stored on the EPC memory device 24 includes processing to produce a copy of the image via an IOT or processing to produce an image data file for exporting.

The operation of producing a copy includes retrieval of the binary image data from the EPC memory device 24 and subsequently decompressing the retrieved image data by the binary lossless decompress module 36. The decompressed image data is then processed to generate contone image data by the binary to contone restoration module 38. The contone image data is subsequently processed by the IOT engine 40 which produces a print 42 of the original PDL file or scanned image.

The operation of producing a scanned image file for export includes retrieval of the binary scanned image data from the EPC memory device 24 and subsequently converting the retrieved scanned image data to a format appropriate for exporting; these operations being performed by a scan post-process module 41. The scan post-process module 41 includes a scan binary lossless decompress module 43 which performs the necessary decompression of the compressed binary formatted image data, and a scan binary to contone restoration module 44 which performs the necessary restoration of the image data for exporting. The algorithms employed by the scan post-processing module 44 will be dependant on the user selected scan mode, output format, desired compression, etc.

In addition, the scan-processing module includes an export processing module 45 to provide the necessary processing of the contone image data for exporting. This processing configures the image data for transmission to a digital data receiving device, such as a pc, server, network, etc.

Figure 2:
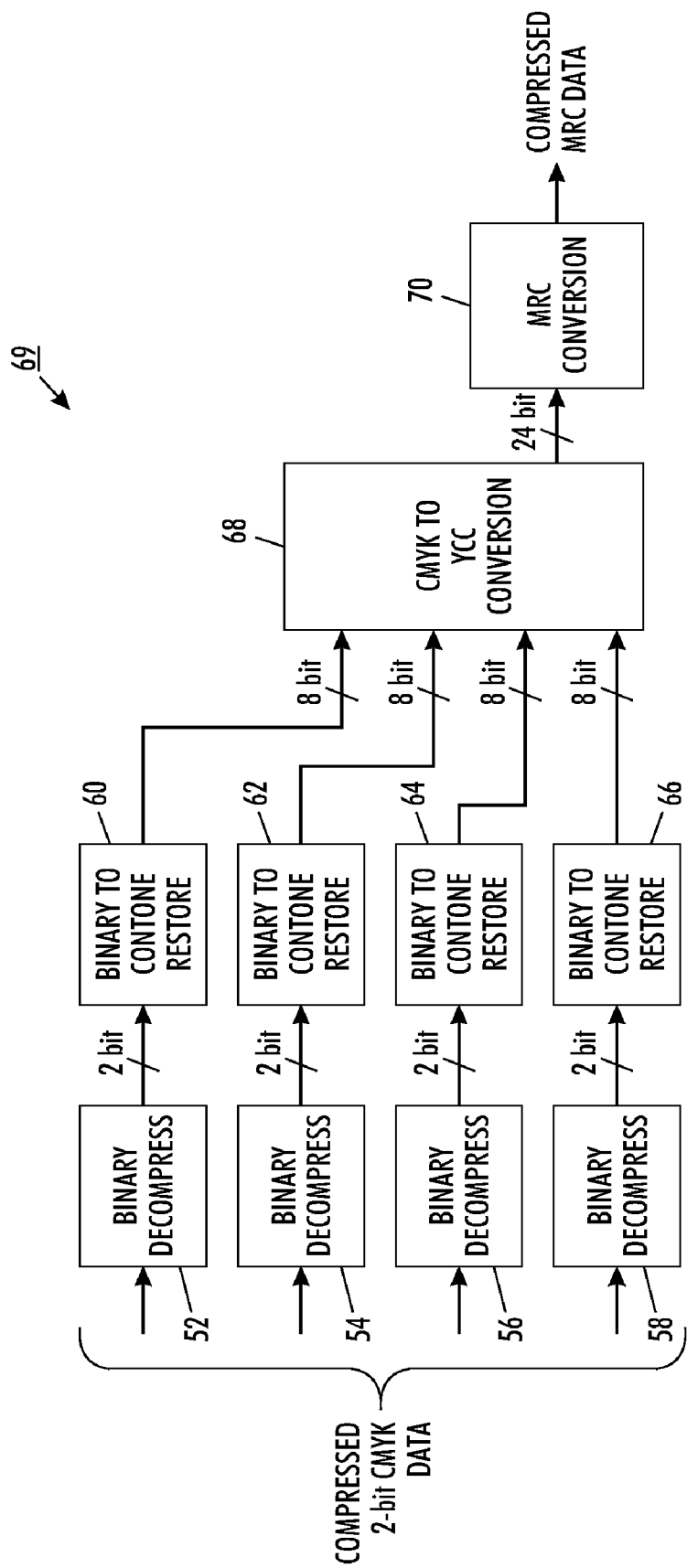
FIG. 2 is a schematic representation of another image data path according to another exemplary embodiment.

With reference to FIG. 2, illustrated is a schematic representation of a scan post-process module 69 according to one embodiment of this disclosure. The scan post-process converts binary formatted compressed CMYK plane image data to contone image data and the CMYK contone data is converted to a device independent YCC color space before being converted to the final scan export format. One possible CMYK to YCC conversion 68 performs a 4-D tetrahedral interpolation through a 17×17×17×17 look-up table from the ICC profile of the MFD.

Initially, the binary image data is retrieved from the EPC memory device 24. Then, each color, C, M, Y and K, of the binary image data is independently decompressed by binary decompress modules 52, 54, 56 and 58, respectively, and restored to contone image data. All four color planes are inputted to a CMYK to YCC converter for further processing to generate the necessary data format for the MRC (Mixed Raster Content) converter. The compressed image MRC data is subsequently exported to an image data receiving device (not shown).

A more detailed description of the scan-post process is now provided. The binary decompress modules 52, 54, 56 and 58 generate 2-bit image data representative of the CMYK image. One bit an image data bit and the other bit a tag data bit representative of specific attributes associated with the image data bit. For example, a vertical line pixel, slanted line pixel, edge and/or thin line pixel, etc.

It should be noted the scan-post process module 69 illustrated in FIG. 2, provides a 2-bit to 24-bit process. However, in general, a single bit to a multiple bit process is within the scope of this disclosure and exemplary scan-post process illustrated. For example, a 1-bit to 2-bit, 4-bit, 8-bit, etc. process or other variation. With further reference to the scan-post process illustrated in FIG. 2, subsequent to each CMYK channel being processed by the respective binary decompress modules to generate 2-bit image data, binary to contone restoration modules 60, 62, 64 and 66 process the 2-bit image data to generate 8-bit image data for each respective CMYK color.

A CMYK to YCC conversion module 68 converts the 4 channel 8-bit image data to a single channel 24-bit output.

The MRC conversion module compresses the 24-bit YCC image data for exporting to an image data receiving device.

Figure 3:
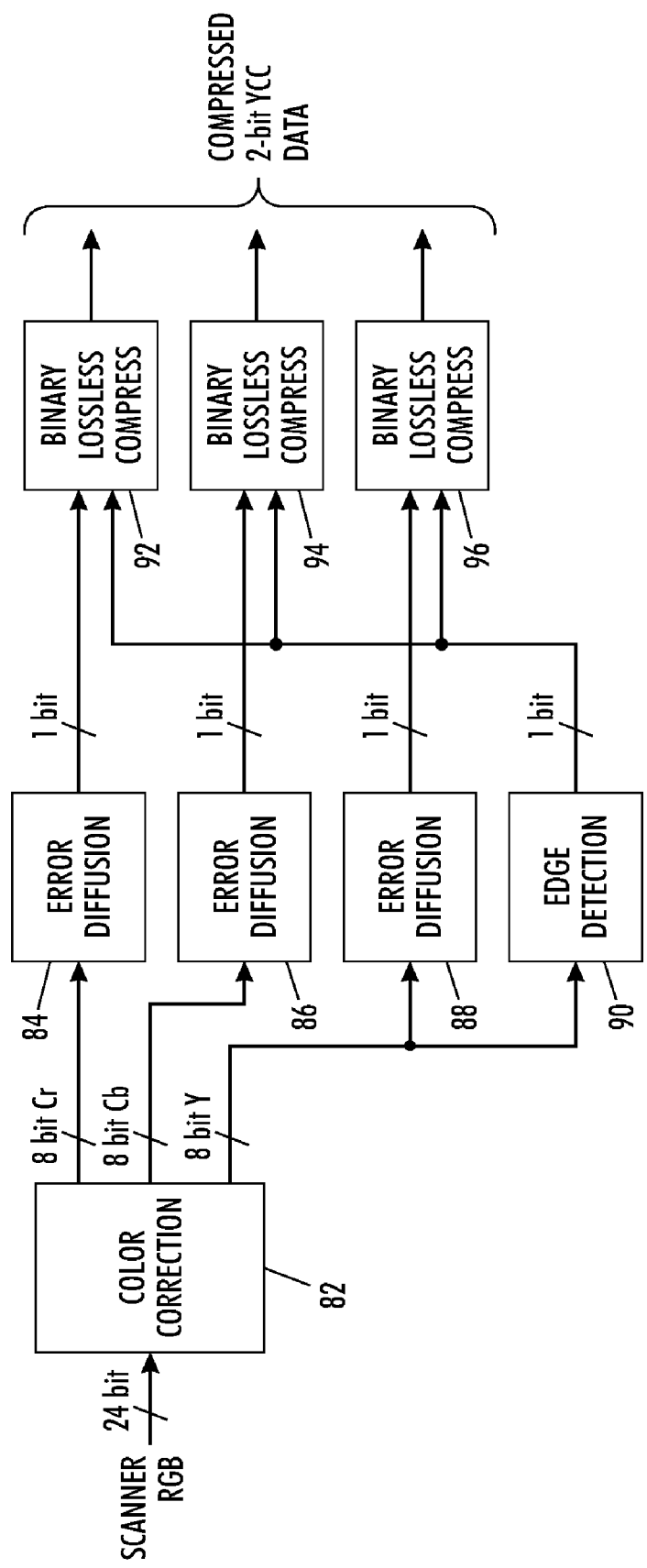
FIG. 3 is a schematic representation of another image data path according to another exemplary embodiment.

With reference to FIG. 3, illustrated is a schematic representation of another input scanning system and process to provide scanned image data for binary format storage. This system uses an intermediate binary YCC color space. Initially, the scanned image is segmented, processed and converted to YCC color space as illustrated. The resultant YCC 24-bit output is then rendered to three individual 1-bit binary YCC planes using error diffusion. The output of the error diffusion modules and the segmentation information is combined to form three 2-bit YCC planes. This data is binary losslessly compressed and stored by the EPC memory device (not shown).

A more detailed description of the scanned image data processing illustrated in FIG. 3 is now provided.

The input scanner provides a 24-bit RGB image data to a color correction module 82. The color correction module processing 82 the 24-bit data to generate 8-bit Cr, 8-bit Cb and 8-bit Y image data. The 8-bit Cr data is processed by an error diffusion module 84 to produce 1-bit image data, the 8-bit Cb data is processed by an error diffusion module 86 to produce 1-bit image data and the 8-bit Y image data is processed by an error diffusion module 88 to produce 1-bit image data. In addition, the 8-bit Y image data is processed by an edge detection module 90.

The error diffusion modules each produce 1-bit image data which is compressed via a binary lossless compression algorithm. Specifically, 1-bit Cr error diffused image data and a respective edge detection bit are processed by binary lossless compress module 92, 1-bit Cb error diffused image data and a respective edge detection bit are processed by a binary lossless compress module 94, and 1-bit Y error diffused image data and a respective edge detection bit are processed by binary lossless compress module 96.

The output of the scanned image processing according to FIG. 3, is compressed 2-bit YCC image data. The 2-bit YCC image data is subsequently stored on a binary data storage device. For example, the EPC memory device illustrated in FIG. 1.

Figure 4:
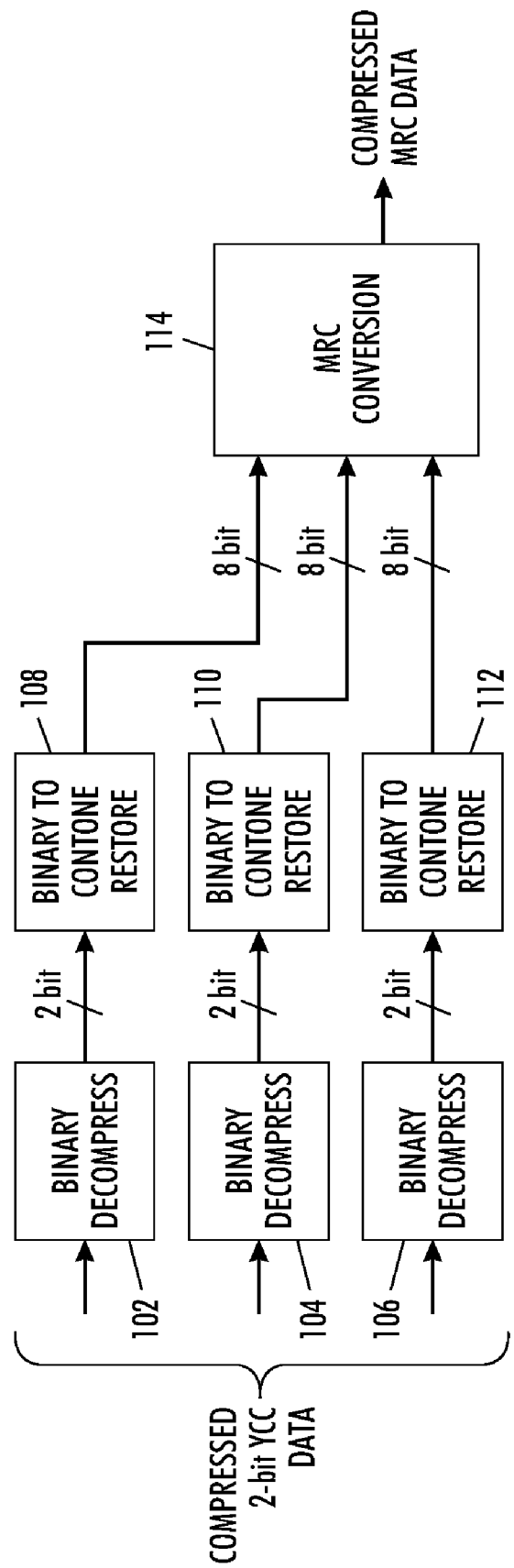
FIG. 4 is a schematic representation of another image data path according to another exemplary embodiment.

With reference to FIG. 4, illustrated is a schematic representation of the 2-bit YCC data scan post processing for exporting. The 2-bit YCC data is retrieved from a binary data storage device, for example the EPC memory device illustrated in FIG. 1, decompressed and restored to contone image data. The contone image data is subsequently converted and compressed for export to an image data receiving device based on the user selected scan features, such as, scan mode and output format.

A more detailed description of the scan post-process is now provided.

Initially, compressed 2-bit YCC image data is retrieved from a binary data storage device, for example an EPC memory as illustrated in FIG. 1. The compressed 2-bit YCC image data representing 1-bit image data and 1-bit tag data as discussed with reference to FIG. 3.

Each color channel of the image data is decompressed via binary decompress modules 102, 104 and 106 to produce decompressed 2-bit image data. The decompressed 2-bit image data is restored to 8-bit image data by binary to contone restore modules 108, 110 and 112.

The 8-bit YCC image data is subsequently compressed by a MRC conversion module 114 which formats the data for transmission to an image data receiving device.

Figure 5:
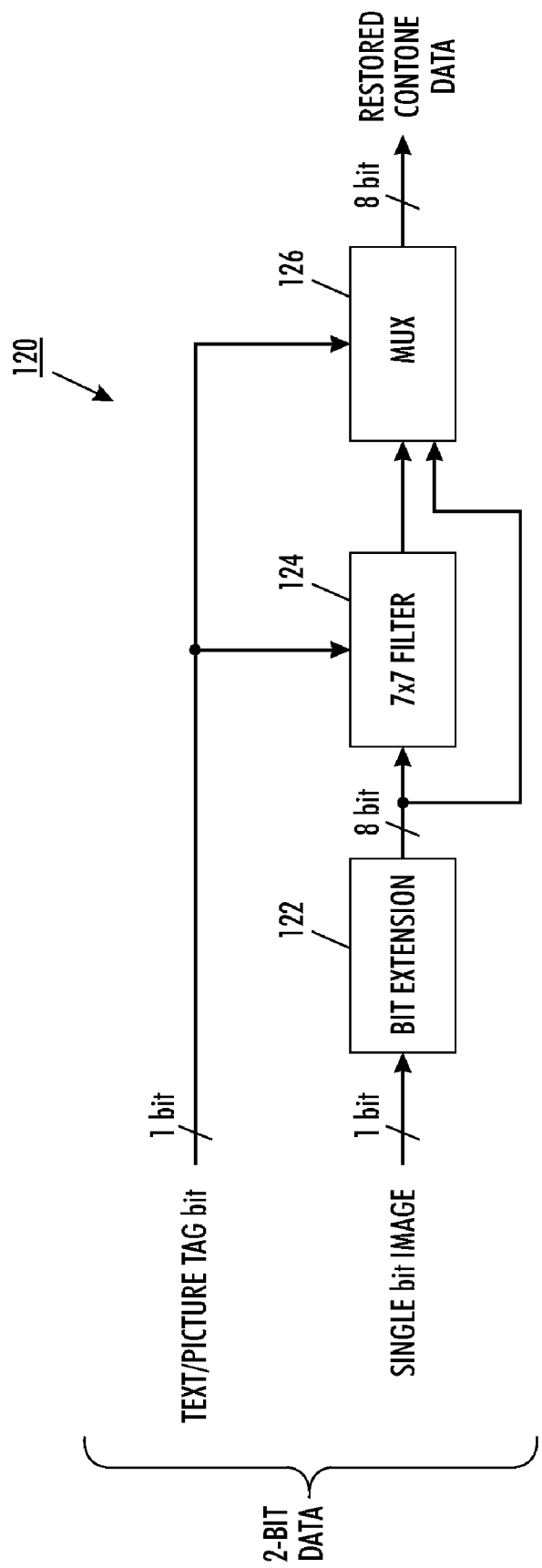
FIG. 5 is a schematic representation of another image data path according to another exemplary embodiment.

With reference to FIG. 5, illustrated is one example of binary to contone restoration module 120. This binary to contone restoration can be utilized in the copy post-process and/or the scan post-process as illustrated in FIG. 1.

More specifically, 2-bit image data representing a binary data representation of an image is restored to 8-bit contone data. To accomplish this restoration, the 1-bit image data is processed by a bit extender module 122 to produce 8-bit image data. The 8-bit extended image data and 1-bit image tag data is processed by a 7×7 filter 124. The output of the 7×7 filter and the 8-bit extended image data is MUXed 126 to produce 8-bit restored contone image data.

It will be appreciated that various of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. An image data processing system comprising:
   a binary lossless decompression module configured to receive compressed binary image data and decompress said binary image data;
   a binary to contone restoration module operatively connected to the binary lossless decompress module, the binary to contone restoration module configured to convert the decompressed binary image data to multiple bit restored image data; and
   an export processing module operatively connected to the binary to contone restoration module, the export processing module configured to process the multiple bit restored image data for exporting to an image data receiving device.

2. The image data system according to claim 1, the binary to contone restoration module further comprising:
   a bit extension module, the bit extension module configured to receive single bit image data and output multiple bit image data;
   a 7×7 filter, the 7×7 filter configured to receive the said multiple bit image data and tag bit data associated with the image data, and the 7×7 filter configured to output filtered multiple bit image data; and
   a MUX, the MUX configured to receive the said tag bit data, the said multiple bit image data and the said filtered multiple bit data, and the MUX configured to output the said multiple bit restored image data.

3. The image data processing system according to claim 1, wherein the binary lossless decompress module is configured to receive compressed 2-bit CMYK image data, and the export processing module converts CMYK image data to YCC image data.

4. The image data system according to claim 3, the export processing module generating compressed MRC image data.

5. The image data system according to claim 3, wherein the multiple bit restored image data is 8-bit image data.

6. A method of processing digital image data comprising: using a processor to perform the steps of:
   (a) retrieving compressed binary image data from a binary data memory device;
   (b) decompressing the compressed binary image data;
   (c) restoring the decompressed binary image data to contone image data; and
   (d) exporting the contone image data to an image data receiving device.

7. The method of processing digital image data according to claim 6, further comprising:
   scanning an image to produce digital image data;
   pre-processing the digital image data to produce binary image data;
   compressing the binary image data; and
   storing the compressed binary image data on a binary data memory device.

8. The method of processing digital image data according to claim 6, wherein step a) includes generating compressed MRC image data for exporting to the image data receiving device.

9. An image data processing system comprising:
   a means for retrieving compressed binary image data from a binary data memory device;

a means for decompressing the compressed binary image data;

a means for restoring the decompressed binary image data to contone image data; and a means for exporting the contone image data to an image data receiving device.

10. The image data processing system according to claim 9, further comprising:

a means for scanning an image to produce digital image data;

a means for pre-processing the digital image data to produce binary image data;

a means for compressing the binary image data; and a means for storing the compressed binary image data on a binary data memory device.

11. The image data processing system according to claim 9, wherein the means for exporting the contone image data generates compressed MRC image data.

* * * * *